US005261949A

United States Patent [19]

Schilling

[11] Patent Number: 5,261,949

[45] Date of Patent: Nov. 16, 1993

[54] METHOD OF PRODUCING AN ATOMIZED LIQUID TO BE CONVEYED IN A STREAM OF CARRIER GAS AND APPARATUS FOR IMPLEMENTING THE METHOD

[75] Inventor: Siegfried Schilling, Russikon, Switzerland

[73] Assignee: Sintermetallwerk Krebsöge GmbH, Radevormwald, Fed. Rep. of Germany

[21] Appl. No.: 655,455

[22] PCT Filed: Jun. 27, 1990

[86] PCT No.: PCT/EP90/01022

§ 371 Date: Feb. 28, 1991

§ 102(e) Date: Feb. 28, 1991

[87] PCT Pub. No.: WO91/00479

PCT Pub. Date: Jan. 10, 1991

[30] Foreign Application Priority Data

Jun. 29, 1989 [DE] Fed. Rep. of Germany ....... 3921255

[51] Int. Cl.[5] ...................... B01D 47/06; B01D 53/14

[52] U.S. Cl. ...................................... 95/216; 95/227; 95/267; 95/288; 55/267

[58] Field of Search .................. 55/80, 84, 89, 90, 94, 55/208, 267-269

[56] References Cited

U.S. PATENT DOCUMENTS

| | | | |
|---|---|---|---|
| 1,422,839 | 7/1922 | de Clamecy | 55/90 |
| 3,142,548 | 7/1964 | Krantz | 55/89 |
| 3,339,344 | 9/1967 | Pallinger | 55/90 |
| 3,339,511 | 9/1968 | Geiringer | 55/84 X |
| 4,141,701 | 2/1979 | Ewan et al. | 55/94 X |
| 4,252,543 | 2/1981 | Giles | 55/89 X |
| 4,284,609 | 8/1981 | deVries | 55/94 X |
| 4,810,268 | 3/1989 | Chambers et al. | 55/94 X |
| 5,004,484 | 4/1991 | Stirling et al. | 55/94 X |

FOREIGN PATENT DOCUMENTS

| | | | |
|---|---|---|---|
| 161969 | 1/1958 | Sweden | 55/84 |

*Primary Examiner*—Robert Spitzer

*Attorney, Agent, or Firm*—Spencer, Frank & Schneider

[57] ABSTRACT

A liquid mist for being conveyed by a carrier gas stream is produced from a liquid by atomizing the liquid into the carrier gas stream in the form of a collection of droplets, deflecting the collection of droplets in the carrier gas stream at a deflection region, separating droplets in the collection of droplets which exceed a maximum size from the carrier gas stream, collecting at least a part of the separated droplets on at least one heatable contact surface, and at least partially vaporizing them into the carrier gas stream.

18 Claims, 3 Drawing Sheets

FIG.3
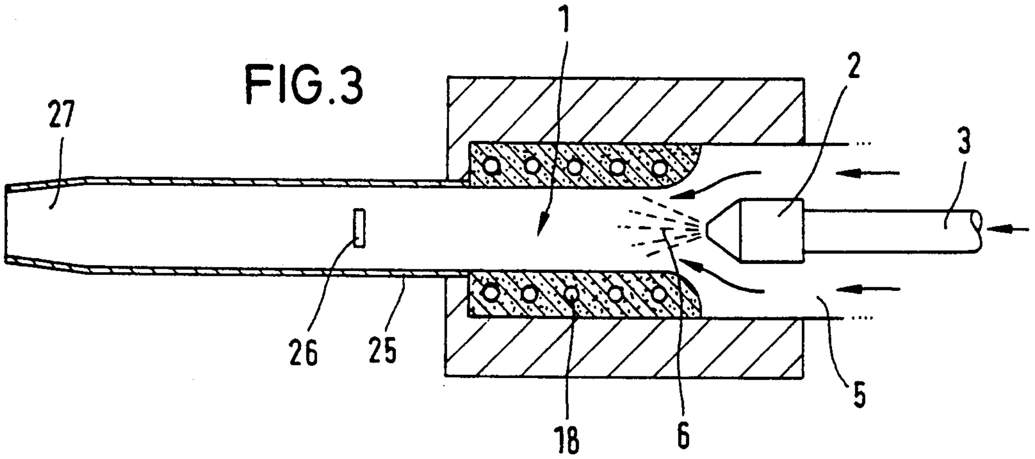
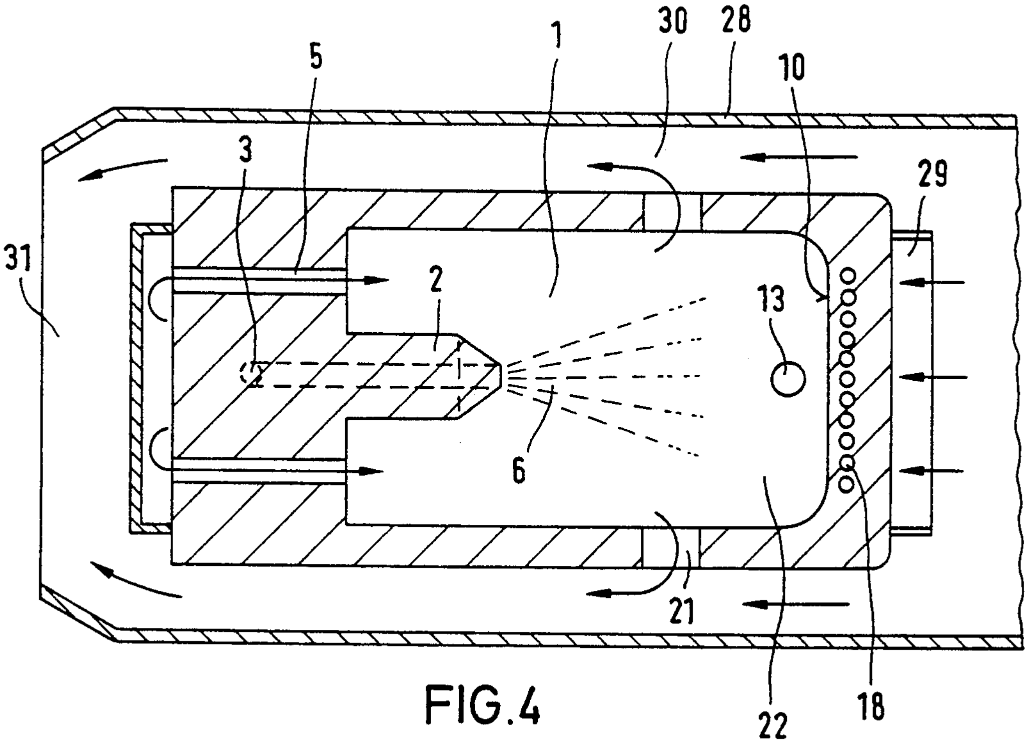
FIG.4

METHOD OF PRODUCING AN ATOMIZED LIQUID TO BE CONVEYED IN A STREAM OF CARRIER GAS AND APPARATUS FOR IMPLEMENTING THE METHOD

BACKGROUND OF THE INVENTION

1. Field of the Invention

This invention relates to a method of producing an atomized liquid that is to be conveyed in a carrier gas.

2. Background Information

The atomization or vaporization of a liquid into a carrier gas is particularly difficult if relatively small mass streams of less than two kilograms per hour are to be atomized at a high degree of fineness (droplet diameter less than 100 μm); that is, ultrasmall liquid droplets must be produced. The atomization with the aid of nozzles and the liquid to be atomized under high pressure encounters natural limits with respect to the realizable smallness of the droplets since the required liquid flow rate must be produced with extremely small nozzle flow cross sections. For example, in a series of applications, the geometrical transverse dimensions for mass streams in a range of two kilograms per hour lie between 0.1 and 0.3 mm which in practice leads to clogging and non-reproducible atomization rates. Moreover, it cannot be avoided here that insufficient break-off of the liquid stream causes larger droplets to be formed repeatedly at the nozzle itself; in the subsequent utilization of the resulting mist such larger droplets have a disadvantageous effect. For example, in the atomization of heating oil where, in particular, the larger droplets contained in the collections of droplets cause the known problems of ancillary mist field formation in the region of the root of the flame and thus insufficient combustion with relatively long flames. Another drawback of the prior art atomization methods with the aid of nozzles is that, even if high strength materials are employed, cavitation phenomena occur in the region of the nozzle opening which, after a corresponding period of operation, lead to worsening of the atomization result. This occurs the earlier, the greater the degree of atomization and, connected therewith, the greater the admission pressure to be exerted onto the liquid.

In order to overcome these drawbacks, atomizer-vaporizer devices are known which are operated with a driving gas, particularly air, to atomize a liquid. Such devices are, for example, oil vaporizers for the lubrication of bearings or pneumatic oil atomizers for heating oil burners used in private homes or steam pressure atomizers used in industry. In these devices, the liquid to be atomized, for example the heating oil, is atomized by means of compressed air or steam in an injector nozzle or at curved guide faces. Although this yields good atomization rates with small throughputs, there exists the drawback in the amount of equipment required to generate the compressed air, for example for the pneumatic atomizers. The required air pressures of 0.6 to 1.2 bar and volume streams of 600 to 1200 $dm^3/h$ necessitates the use of compressors since it is technically impossible to realize such increases in pressure with blowers.

SUMMARY OF THE INVENTION

It is the object of the invention to provide a method of producing an atomized liquid that can be conveyed in a stream of carrier gas and with which it is ensured that only the smallest droplets up to a defined droplet size limit are carried by the carrier gas stream.

This is accomplished according to the invention in that the liquid is atomized in a carrier gas stream as a collection of droplets, the collection of droplets is deflected in the carrier gas stream and droplets in the collection which exceed a maximum size are separated from the carrier gas stream in the deflection region. This method has the advantage that even if atomization takes place by means of a conventional atomizer nozzle which produces a collection of droplets that exhibit great differences in the droplet diameter, all droplets that are too large for the particular purpose are separated; thus the collection of droplets is "classified". Another advantage of this method is that the mixing ratio between carrier gas and mist can be regulated automatically by way of the throughput of carrier gas, since with given flow cross sections the sweeping forces exerted by the carrier gas on the smallest droplets are a function of the flow velocity of the carrier gas. With a constant liquid throughput and a slow carrier gas velocity, only the smallest droplets are carried along in the deflection region while the larger droplets are separated. If the flow velocity of the carrier gas is increased, droplets up to a certain size limit ar still carried along by the carrier gas in the deflection region, with the increase in the flow velocity simultaneously increasing the centrifugal forces acting on the individual droplets in the deflection region so that these centrifugal forces counteract the sweeping forces exerted on the larger droplets, thus ensuring that only that droplet size is carried along by the carrier gas which satisfies the desired misting or, more precisely, aerosol conditions.

A preferred feature of the method according to the invention, provides that at least a part of the collection of droplets, particularly those droplets exceeding a maximum size, are collected at at least one heatable contact surface and are at least in part vaporized into the carrier gas stream. This arrangement has the advantage, particularly with larger throughputs, that the quantity of liquid separated from the carrier gas stream in the form of undesirably large droplets is at least in part re-introduced into the carrier gas stream by the subsequent vaporization. Another advantage of this method is that an additional control is possible for the mixing ratio between carrier gas and vaporized liquid by the appropriate regulation of the temperature. While the mass stream of the liquid can be varied only slightly in view of the degree of atomization possible with a given nozzle cross section and limits also exist for the flow velocity of the carrier gas in the deflection region in view of the marginal conditions that must be maintained for the droplet size to be picked up by the carrier gas, the additional vaporization of liquid droplets into the carrier gas stream by way of a heated contact surface provides an even better result particularly when the upper limits given by these conditions are realized. With the aid of the method according to the invention, an aerosol-like vaporization of the liquid is realized with vaporization as well as without vaporization of the separated droplet portion so that it is possible, for example, in the vaporization of heating oil, to conduct the carrier gas stream carrying the mist like a combustion gas through a conduit system to the location of use, with it only being necessary to observe the usual conditions for avoiding a temperature drop below the dew point and thus condensation processes at the channel surfaces, for example due to heating of the carrier gas and/or heating of the channel walls.

As a further feature of the invention, it is provided that at least part of the droplet portions to be vaporized are collected in the atomization region at a heatable contact surface and are vaporized there. This can be effected, for example, in that part of the jet from the nozzle impinges directly on the heatable contact surfaces, for example through a broadly fanning nozzle.

As a further, advantageous feature of the method according to the invention, it is provided that at least part of the droplet portions to be vaporized are collected and vaporized by a heatable contact surface in the deflection region. As a further advantageous feature of the invention, it is provided that the droplet portion to be atomized is collected on the surface of an open-pored contact body, with this surface serving as the contact surface, is heated to the boiling point within the contact body and is released from the contact surface to the carrier gas stream as a mixture of droplets and vapor. The special effect of this configuration according to the invention results in that not only the evaporating liquid portion is transferred to the carrier gas stream but the vapor formation in the contact body causes liquid bubbles to be formed simultaneously at the surface and these bubbles burst due to the continuing vapor pressure, with part of the bubble surface being hurled back into the carrier gas stream in the form of ultrafine droplets. This process is particularly effective if a liquid is to be atomized which is composed of portions having different boiling points. Heating in the region of the contact body need then take place only to the temperature of the liquid portion having the low boiling point. Since with this manner of proceeding, part of the liquid is atomized, in addition to the vaporization process, purely mechanically into ultrafine droplets, there results a reduction in the required heating energy.

As a further feature of the method according to the invention it is provided that the liquid portion separated from the carrier gas stream and collected in a reflux stream is conducted through a heat exchanger and discharges its heat to the liquid serving to produce the atomization. This manner of proceeding is of particular advantage if at least part of the carrier gas stream is heated before it is introduced into the atomization region.

The invention further relates to an apparatus for producing an atomized liquid carried in a carrier gas stream, particularly according to the method of the invention, the apparatus including a mixing chamber equipped with at least one inlet for a carrier gas stream, at least one atomizer nozzle for the introduction of a liquid as a collection of droplets and at least one outlet for the atomized liquid.

According to the invention, the apparatus is configured in such a way that the mixing chamber is provided with a deflection surface which is spaced from the nozzle opening and is intended for the carrier gas portion charged with the collection of droplets. This mixing chamber is followed by an outlet for the carrier gas stream carrying the liquid mist. A discharge conduit is provided for the separated droplet portions which have flowed together to form a reflux liquid. With such an apparatus it is possible, by a purely mechanical measure, namely the deflection of the carrier gas stream carrying the collection of droplets, to separate all droplets exceeding a given maximum size from the collection of droplets and to continue transporting only the very smallest droplets, preferably an aerosol-like droplet portion, in the carrier gas stream. The respectively desired maximum size of the droplets can be determined by the degree of deflection. The greatest separation effect is realized with a deflection of about 180°; that is, if initially the carrier gas stream and the jet from the nozzle are conducted in the same direction to realize the most uniform droplet distribution and a corresponding acceleration of the droplets so that thereafter, by way of a deflection in the opposite direction, only droplets below a maximum size are carried along by the sweeping forces of the carrier gas stream, while all droplets exceeding the maximum size essentially retain their original direction of movement as a result of the inertial forces in the deflection region and are thus separated from the carrier gas stream, for example, by impacting on a rebounding plate.

In the simplest embodiment, the jet from the nozzle itself may be introduced into the carrier gas stream at an angle. However, an advantageous feature of the invention provides that the mixing chamber is provided with at least one inlet opening in the nozzle region for at least part of the carrier gas, with the opening being preferably oriented in the direction of the jet from the nozzle. This arrangement has the advantage that intimate mixing of droplets and carrier gas can take place already, with primarily the larger droplets even being accelerated by way of the flow velocity of this partial stream. Another advantage of this embodiment is that the carrier gas stream can be introduced into the mixing chamber as a swirling stream so that, already in this region, care is taken that the larger droplets are separated. A suitable feature further provides that the nozzle is configured as a venturi nozzle and is connected with an inlet for the compressed air provided to support the atomization. The required primary air for use as an oil atomizer for a subsequently connected burner can be introduced into the mixing chamber in order to support the atomization.

A further feature of the invention provides that the mixing chamber is given a tubular configuration and is arranged coaxially with the nozzle; the end of the mixing chamber facing away from the nozzle opens into a deflection chamber; and the wall of the deflection chamber disposed opposite the opening of the mixing chamber is configured as a deflection surface.

Another feature of the invention provides that the deflection chamber coaxially encloses the tubular mixing chamber and that the outlet for the carrier gas stream charged with the liquid mist is arranged in the direction opposite to the flow of the jet from the nozzle at a distance from the opening of the mixing chamber into the deflection chamber. The sharp deflection brought about thereby for the carrier gas stream charged with the collection of droplets ensures that only the smallest droplets can be carried along by the carrier gas stream.

As another feature of the invention it is provided that the walls of the mixing chamber form a contact surface and are connected with a heating device. In this way it is ensured that already in the mixing chamber itself the droplet portion impinging on the walls can be vaporized into the carrier gas stream. This is of particular advantage if the mixing chamber and its contact surface have a tubular shape and the carrier gas stream is introduced into the mixing chamber as a swirling stream. The large droplets are here thrown against the walls of the mixing chamber substantially in the intake region, are then carried along by the carrier gas stream as a liquid film so that, in the manner of a thin-film vaporization, the expelled droplet portion can be vaporized into the carrier gas stream. Therefore, only the larger droplets which are not expelled by the swirling stream need be separated from the carrier gas stream. In this connection it is particularly advisable to arrange a rotary wiper associated with the atomizer nozzle in the tubular mixing chamber. In this way, practically the entire quantity of liquid can be applied to the contact surface and vaporized there even if the atomization is relatively coarse. It is advisable in this connection for the rotary wiper to be equipped with at least two radially oriented wiper blade each being charged by at least one nozzle opening. The liquid portions impinging on the wiper blades are hurled outwardly by centrifugal force so that, under the most favorable flow of carrier gas through the mixing chamber, practically the entire quantity of liquid reaches the contact surface and is able to vaporize there. Advisably the wiper blades are given a helical or propeller shape so that, with the appropriate driving power from a motor, whose number of revolutions is preferably controllable, the wiper blades act as a ventilator for the carrier gas stream conducted through the mixing chamber, thus reducing at least the flow resistance in this region.

Another feature of the invention provides that the deflection surface forms a contact surface and is connected with a heating device. This arrangement may be employed alone or in combination with a mixing chamber wall configured as a heatable contact surface.

As another feature of the invention it is provided that the deflection surface is formed by a deflection body disposed in the carrier gas stream. Such an arrangement is of particular interest if the carrier gas stream and the jet from the nozzle are guided axially as a whole so that the deflection body is merely intended to ensure that large droplets carried along particularly in the central region of the carrier gas stream are separated.

As another advantageous feature of the invention it is provided that the contact surface is formed by the free surface of an open-pored contact body which, in its region facing away from the contact surface, is connected with a preferably electrical heating device. The use of the arrangement of such an open-pored contact body which, for example, may also form the walls of the mixing chamber, is advisable particularly if liquid mixtures are to be vaporized which contain liquid components having different boiling temperatures. Due to the capillary effect, the liquid penetrates into the contact body, the low boiling point component vaporizes and, while forming bubbles at the contact surface, drives out the still liquid higher boiling point liquid component in the form of bubbles, with the bursting bubbles being expelled into the carrier gas stream in the form of ultrafine droplets. With a view toward good thermal conductivity for the vaporization process to be realized, the open-pored contact body is advisably composed of a sintered metal and advisably has a porosity which corresponds to a cavity volume between about 30% to 80%, preferably between 40% and 60% of the contact body volume. The average pore diameter in the contact body advisably lies between about 20 and 150 μm, preferably between 40 and 100 μm.

As a further advantageous feature of the invention it is provided that in the region of extraction of the reflux liquid, there is disposed an outlet valve which automatically adjusts itself in dependence on the pressure of the incoming liquid. This ensures proper extraction of the reflux liquid from the mixing chamber and from the deflection chamber, respectively, since then the outlet valve opens as a function of the quantity of liquid introduced into the mixing chamber by way of the atomizer nozzle.

BRIEF DESCRIPTION OF THE DRAWINGS

The invention will now be described in greater detail with reference to schematic drawings of embodiments thereof. It is shown in:

FIG. 3, a heating oil-air mixture generator;

FIG. 4, another embodiment of a heating oil-air mixture generator;

DETAILED DESCRIPTION OF THE PREFERRED EMBODIMENTS

Figure 1:
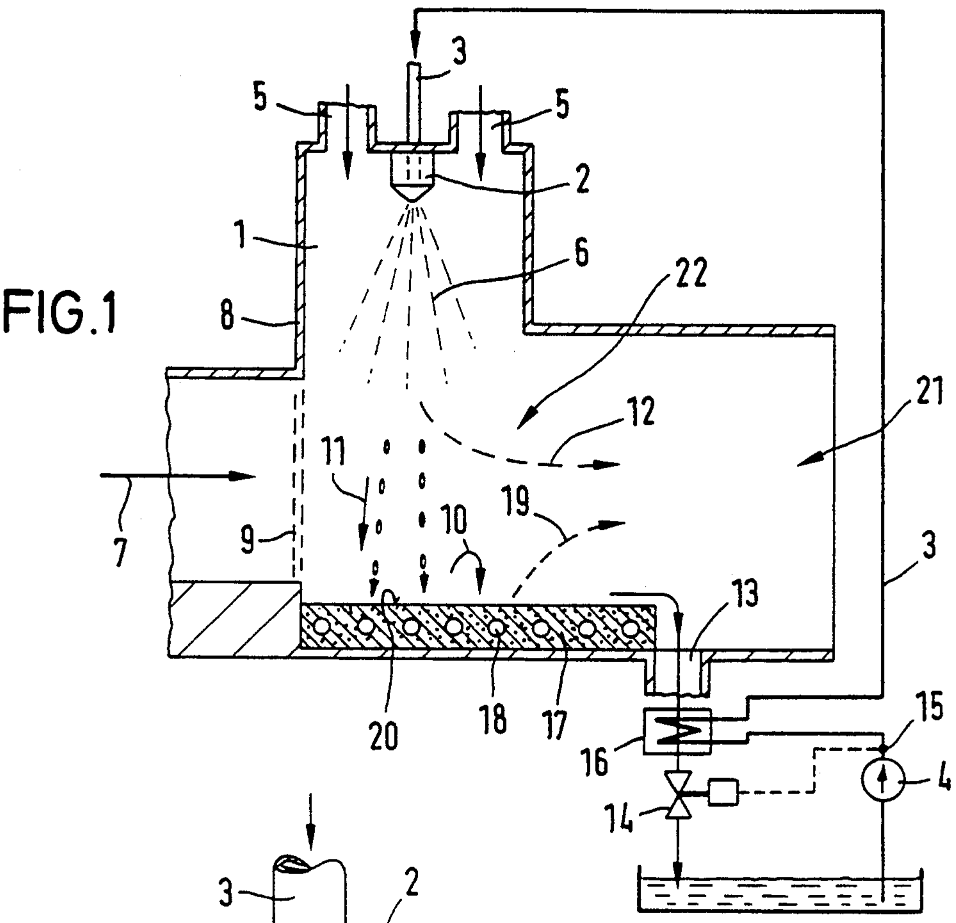
FIG. 1, an apparatus to explain the operational principle.

In the embodiment shown in FIG. 1, a mixing chamber 1 is provided which, for example, has a circular cross section. An atomizer nozzle 2 opens into mixing chamber 1 and is in communication via a pipeline 3 with a conveying pump 4. Coaxially with atomizer nozzle 2, two inlet conduits 5 for the introduction of a carrier gas open into mixing chamber 1. Within the mixing chamber, the carrier gas is conducted in the same direction as a spray jet 6.

The collection of droplets introduced into the partial carrier gas stream by way of spray jet 6 is now deflected. As indicated schematically in FIG. 1, this may be effected in that the mixture of carrier gas and droplets is charged at an angle into a main carrier gas stream 7 or in that the entire quantity of carrier gas which is introduced coaxially with spray jet 6 is deflected due to an appropriate angle in the flow channel. This is shown in FIG. 1 by the dashed-line extension 9 of the side wall 8 of mixing chamber 1. The deflection region is constituted by deflection chamber 22 and its outlet 21.

A wall 10 disposed directly opposite nozzle 2 here constitutes a deflection surface. Due to the centrifugal forces acting on the larger droplets as a result of the deflection, supported by the inertial forces acting in approximately the same direction, the large droplets are thrown onto deflection surface 10 (arrow 11) so that in the deflection region only the smallest droplet portions are carried along as a mist by the carrier gas stream (arrow 12).

The large droplets impinging on deflection surface 10 flow together into a reflux stream and can be extracted from the apparatus as reflux liquid through an outlet 13. An outlet valve 14 controlled as a function of pressure and actuated by way of a pressure control device 15 disposed in inlet conduit 3 ensures that the discharge flow cross section available for the reflux liquid is always proportional to the quantity of liquid charged.

If the liquid is atomized in a heated carrier gas stream, the thermal energy contained in the reflux liquid is advisably recovered by way of a heat exchanger 16 which is connected with conveying conduit 3.

To improve the vaporization output, the wall portion 17 forming the deflection surface 10 in the illustrated embodiment is configured, for example, to be electrically heatable, as indicated schematically by heating rods 18. The liquid droplets which converge on the deflection surface in the form of a liquid film are now at least in part vaporized when wall portion 17 is heated to the boiling temperature of the liquid so that the resulting vapor (arrow 19) is carried along by the carrier gas stream. The expenditures for thermal energy are relatively low since only a thin layer of liquid needs to be vaporized. The important factor here is that deflection surface 10, which serves as the heatable contact surface, projects to a sufficient length beyond the impact region 20 of the large droplets so that vapor formation can take place without disturbance.

In order to improve the vaporization output, the wall portion 17 forming the contact surface may also be configured as an open-pored contact body so that the capillary effect sucks in the impinging droplets, rapid vaporization takes place again within the contact body and the resulting vapor drives part of the liquid, unvaporized, back to the surface, where it forms bubbles. The bubbles burst and part of the bubble skin is carried along by the carrier gas stream in the form of ultrafine droplets together with the vapor portion. This is of particular advantage if the liquid to be vaporized is composed of a mixture of liquids having different boiling points. The low boiling point liquid component is vaporized and thus drives the higher boiling point liquid component out into the carrier gas stream in the form of ultrafine droplets.

Figure 2:
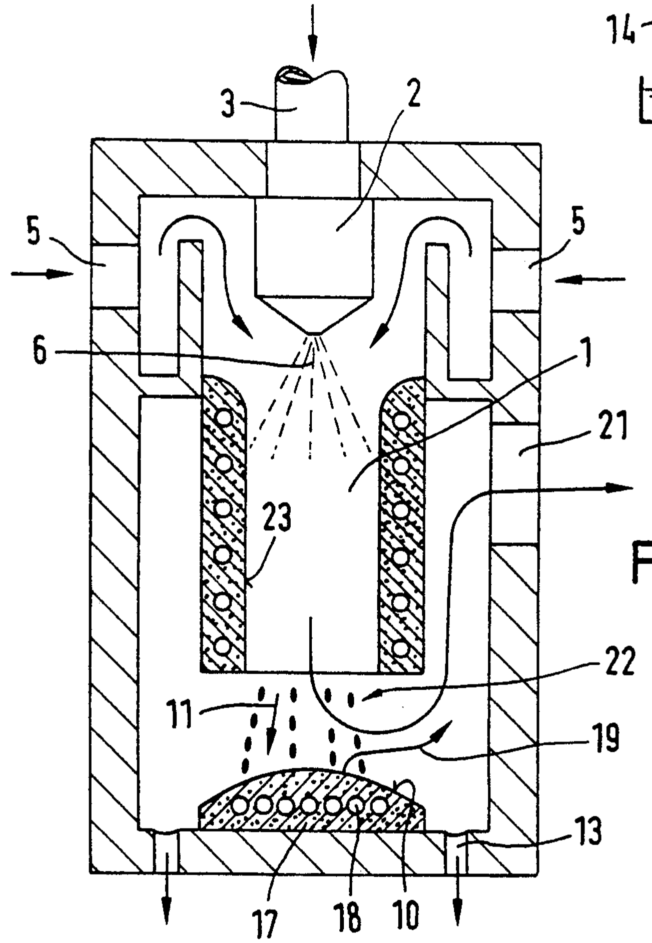
FIG. 2, an aerosol generator.

FIG. 2 is a schematic representation of a modified apparatus. Components which perform the same function as already described in connection with the embodiment of FIG. 1 were given the same reference numerals. Through a nozzle 2, the liquid in the form of a collection of droplets is introduced in the form of a spray jet 6 into a mixing chamber 1. A carrier gas stream is introduced into mixing chamber 1 through inlet conduits 5 coaxially with spray jet 6. Depending on the intended use, the carrier gas stream in the introduction region may also be introduced into mixing chamber 1 as a swirling stream.

The stream of the carrier gas droplet mixture is extracted through an outlet 21 from the tubular mixing chamber 1 while being sharply deflected about 180° so that the carrier gas is able to carry along only the smallest droplets since the influence of the sweeping forces is greater in deflection chamber 22 than the influence of centrifugal forces.

The droplets exceeding the thus defined maximum droplet size (arrow 11) are ejected toward a deflection surface 10 from where they are extracted from the deflection chamber 22 defined by the deflection region through an outlet 13. Deflection surface 10 may here again be formed by a deflection body 17 equipped with a heating device 18 so that the droplet portions collecting there can be vaporized into the carrier gas stream (arrow 19). Here again, deflection body 17 may be an open-pored contact body so as to further improve the nebulizing effect by vaporization.

In the embodiment shown in FIG. 2, not only the deflection body but also the walls 23 of mixing chamber 1 are heatable so that the liquid portions impinging on the surface of the preferably tubular mixing chamber 1 are vaporized into the carrier gas stream.

If the output is to be reduced, the walls of mixing chamber 1 need not be heated. The liquid portions impinging on the mixing chamber walls run together to form a film which then breaks off at the end of the mixing chamber facing away from nozzle 2 in the form of large drops which, simply because of their size, cannot be carried along by the stream which is deflected in this region. If the heating system is turned on in this case, the quantity of liquid collecting at the inner wall of mixing chamber 1 corresponding to the heating power is vaporized into the carrier gas stream so that here, in addition to a control by way of the quantity of carrier gas, which has a direct influence on the flow velocity within the apparatus, it is additionally possible by way of the heating power to control the mixing ratio between carrier gas and liquid mist. In this embodiment as well, the interior wall of mixing chamber 1 may be formed by an open-pored contact body so that the above-described vaporization processes can take place.

FIG. 3 shows another embodiment as it can be employed, in particular, for a heating oil burner. In this embodiment, the heating oil is charged under pressure through a conveying conduit 3 into an atomizer nozzle 2 whose spray jet 6 is introduced axially into a tubular mixing chamber 1. Coaxially with nozzle 2, combustion air is introduced into mixing chamber 1 through inlet 5. Mixing chamber 1 is formed of a pipe 25 made of a material exhibiting good thermal conductivity whose walls at its end facing atomizer nozzle 2 are provided with a heating device 18. At a distance from the opening of atomizer nozzle 2, in the interior of the pipe, there is provided a deflection plate 26 which causes the carrier gas stream carrying the heating oil droplets to be deflected toward the interior walls of pipe 25 so that larger droplets are thrown against the walls. The droplets converging on deflection surface 26 flow together to form larger drops and, with the apparatus preferably being arranged horizontally, collect at the bottom of pipe 25.

At the start of operation, the wall in the forward portion of mixing chamber 1 is heated first by way of a heating device 18 so that the part of the liquid droplets impinging on the wall are vaporized and carried by the combustion air together with the ultrafine droplets as an oil-vapor-air mixture through pipe 25. The opening 27 of pipe 25 is here provided, in a manner not shown in detail, with a flame holder so that the pipe end simultaneously constitutes the burner. Already after a short period of operation, pipe 25 is heated so that, by way of thermal conduction through the pipe material, the part of the pipe wall surrounding the heating oil entrance region of mixing chamber 1 is also heated strongly and therefore heating device 18 can be turned off. Due to the fact that the pipe is heated, any larger droplets carried along perhaps by the stream of combustion air and deposited at deflection surface 26 are also vaporized so that the heating oil portion is carried along by the stream out of opening 27 practically only in the form of vapor, permitting the burner to be operated practically like a gas burner.

FIG. 4 shows a modified embodiment of a heating oil burner. In this embodiment, spray jet 6 is introduced into a mixing chamber 1 that is closed o all sides; at least part of the required combustion air is introduced into mixing chamber 1 coaxially with atomizer nozzle 2 through appropriate inlets 5. Spray jet 6 is directed toward deflection surface 10 which is equipped with heating elements so that only a carrier gas stream charged with ultrafine droplets is able to exit through outlets 21 which are arranged laterally to and spaced from deflection surface 10. By heating the deflection surface, the liquid portion impinging there is vaporized corresponding to the heating power introduced and is also carried along by the carrier gas stream through outlets 21. In the arrangement shown in a sectional view from the top, the non-vaporized liquid portion is extracted from mixing chamber 1 through a discharge opening 13 disposed in its bottom region.

The apparatus is disposed in a flow channel 28 which carries the total amount of air required for the combustion. By way of an appropriate air inlet 29, the part of the combustion air required for the mixing process and introduced through inlet conduits 5, preferably dimensioned as the primary air quantity, is branched off from the total air stream, so that the air quantity flowing in the remaining partial channel 30 constitutes the secondary air quantity which, however, in the region of outlets 21 is mixed again with the primary air enriched with heating oil vapor so that in the exit region 31 of flow channel 28 there is again available a combustible mixture.

Figure 5:
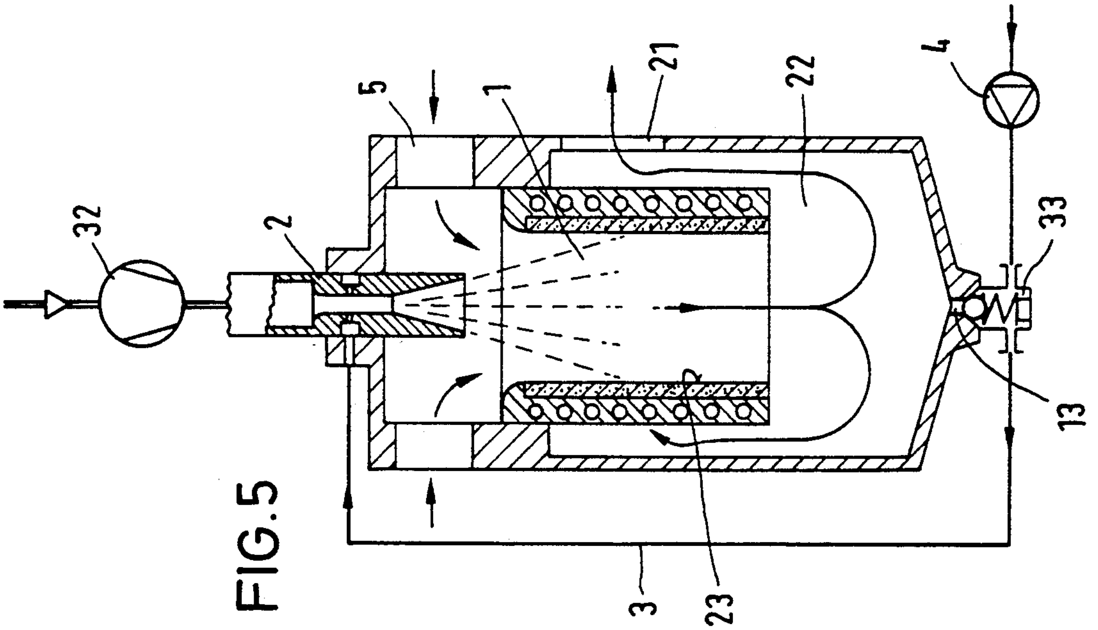
FIG. 5, an embodiment employing compressed air atomization.

FIG. 5 shows an embodiment provided particularly for the vaporization of heating oil. The structure essentially corresponds to the arrangement of FIG. 2 so that reference is made thereto. In deviation from the arrangement of FIG. 2, the nozzle 2 of this embodiment is configured as a venturi nozzle which is charged with air under a pressure of 200 to 400 mb by way of an air compressor 32. The volume of the air stream is about 5% of the stoichiometric air quantity required for combustion. The oil to be vaporized is introduced into the nozzle through pipeline 3 by a conveying pump 4 and is carried along by the air, thus being atomized. Due to the air jet expanding in the wider portion, the droplets are carried along to the outside and are sprayed onto the heatable, open-pored contact surface represented by the walls 23 of mixing chamber 1 so that the impinging liquid portions are vaporized into the carrier gas stream.

A discharge 13 is provided in the bottom region and is in communication with pipeline 3 by way of a valve 33 so that the unvaporized large droplets which were separated during the deflection in deflection chamber 22 can be mixed as small quantities of liquid into the freshly supplied quantity of heating oil.

Figure 6:
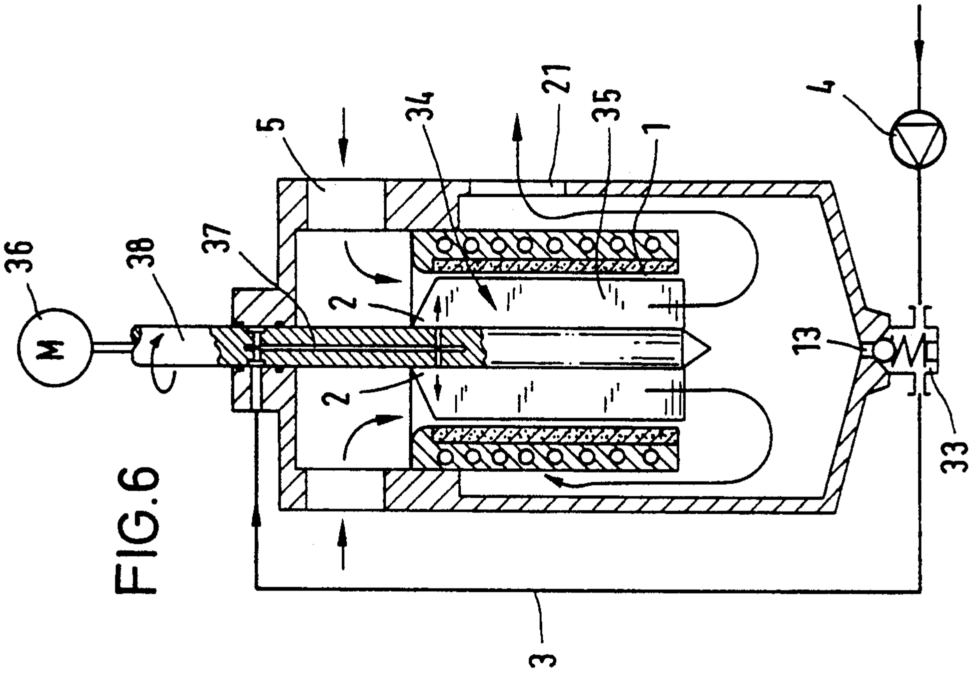
FIG. 6, an embodiment employing mechanical atomization onto a heated contact surface.

In the embodiment shown in FIG. 6, which otherwise corresponds to the structure of the embodiment of FIG. 5, a rotary wiper 34 is inserted in mixing chamber 1, with the rotary wiper being equipped with at least two rotor vanes 35 that end at a close distance from the wall 23 of the contact surface of mixing chamber 1. Rotary wiper 34 is shown only schematically and may have a different structural configuration than shown in the drawing figure. The rotary wiper is driven by a motor 36. By way of an axial bore 37 in shaft 38 of rotary wiper 34, the heating oil to be atomized is charged through nozzle openings 2 onto wiper blades 35 and thus thrown radially outwardly against walls 23 so that practically the entire sprayed-in quantity impinges on the heatable open-pored contact surface and is there vaporized. The liquid to be atomized is here thrown outwardly in the form of a thin film or a streak of film so that ultrafine droplets already impinge on the contact surface from the outer edge of the wiper blades. This permits rapid vaporization to take place in the above described manner.

Nozzle openings 2 may also open out of rotor shaft 38 at an angle relative to the plane of the wiper blades so that an atomization in droplet form takes place initially into the free space between two adjacent wiper blades. The smallest droplets are carried along by the carrier gas stream while the larger droplets are gripped by the faces of the wiper blades and, as already described above, are distributed over the wiper blade surface in the manner of a film and then thrown onto the contact surface.

With respect to the axis of rotation, the wiper blades may be linear but also helical. Their orientation, if they are helical, must be such that, with respect to the direction of rotation, the wiper blades simultaneously act on the carrier air introduced through inlet conduits 5 so as to convey it in the direction of flow.

I claim:

1. A method of producing from a liquid a liquid mist which can be transported in a carrier gas stream, comprising:

atomizing the liquid in an atomization region into a carrier gas stream in the form of a collection of droplets, deflecting the collection of droplets in the carrier gas stream at a deflection region, in the deflection region, separating droplets in the collection of droplets which exceed a maximum size from the carrier gas stream, collecting at least a part of the separated droplets on at least one heatable contact surface, and at least partially vaporizing them into the carrier gas stream.

2. A method according to claim 1, further comprising collecting at least part of the droplets to be vaporized and vaporizing them on a heatable contact surface in the atomization region.

3. A method according to claim 1, further comprising collecting at least part of the droplets to be vaporized and vaporizing them on a heatable contact surface in the deflection region.

4. A method according to claim 3, further comprising receiving the droplets to be vaporized by the surface of an open-pored contact body serving as a contact surface, heating them to a boiling temperature within the contact body and discharging them to the carrier gas stream above the contact surface as a droplet-vapor mixture.

5. A method according to claim 4, further comprising guiding the droplets separated from the carrier gas stream in the form of a reflux stream over a heat exchanger to release its heat to the liquid to be atomized.

6. A method according to claim 5, further comprising heating the carrier gas stream before introducing it into the atomization region.

7. An apparatus for generating from a liquid a liquid mist which can be transported in a carrier gas stream, the apparatus comprising:

a mixing chamber, at least one inlet provided in the mixing chamber for a carrier gas stream, at least one atomizer nozzle provided in a nozzle region of the mixing chamber for producing a spray jet of a liquid mist into the carrier gas stream as a collection of droplets, at least one outlet provided in the mixing chamber for the carrier gas stream charged with the liquid mist, and a deflection surface provided in the mixing chamber for a carrier gas portion carrying the collection of droplets, said deflection surface being spaced from an opening of the nozzle and being followed by the at least one outlet for the carrier gas stream charged with the liquid mist, wherein the at least one inlet opening provided in the nozzle region of the mixing chamber is oriented in the direction of the spray jet for at least part of the carrier gas stream.

8. An apparatus according to claim 7, wherein the nozzle is configured as a venturi nozzle and is connected with an inlet conduit for compressed air to produce the liquid mist spray jet.

9. An apparatus according to claim 7, wherein the mixing chamber is tubular and arranged coaxial with the nozzle; an end of the mixing chamber facing away from the nozzle opens into a deflection chamber and walls of the deflection chamber disposed opposite the opening of the nozzle are configured as the deflection surface.

10. An apparatus according to claim 9, wherein the deflection chamber coaxially encloses the tubular mixing chamber and wherein the outlet for the carrier gas stream charged with the liquid mist is disposed in the direction opposite to the direction of flow of the jet from the nozzle at a distance from a point where the mixing chamber opens into the deflection chamber.

11. An apparatus according to claim 9, wherein a rotary wiper is associated with the nozzle and is disposed in the tubular mixing chamber.

12. An apparatus according to claim 11, wherein the rotary wiper is provided with at least two radially oriented wiper blades, with at least one opening of the nozzle being oriented toward each one of said wiper blades.

13. An apparatus according to claim 7, wherein at least a part of walls of the mixing chamber form a contact surface and are connected with a heating device.

14. An apparatus according to claim 7, wherein the deflection surface forms a contact surface and is connected with a heating device.

15. An apparatus according to claim 14, wherein the contact surface is formed by the surface of an open-pored contact body which, in its region facing away from the contact surface, is connected with a heating device.

16. An apparatus according to claim 7, wherein the deflection surface is formed by a deflection body disposed in the carrier gas stream.

17. An apparatus according to claim 7, wherein the apparatus further includes a discharge for the separated droplet portions which have flowed together into a reflux liquid, and in the region of discharge for the reflux liquid, there is disposed an outlet valve which automatically adjusts itself in dependence on the pressure in liquid intake.

18. An apparatus according to claim 17, wherein, in the region of the discharge for the reflux liquid, there is disposed a heat exchanger which lies in the reflux liquid, with liquid traveling toward the nozzle being conducted through said heat exchanger.

* * * * *